United States Patent Office 3,535,633
Patented Oct. 20, 1970

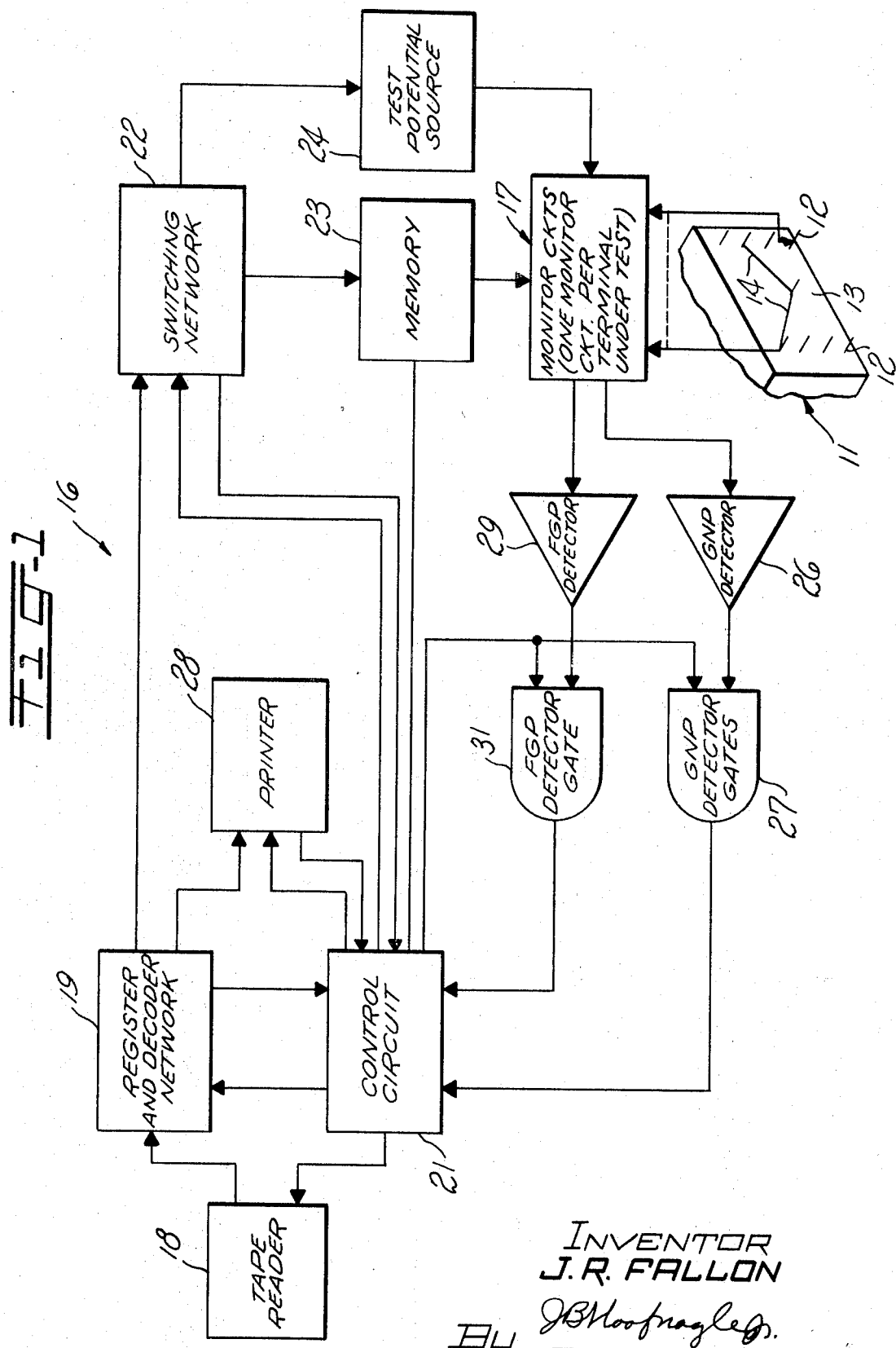

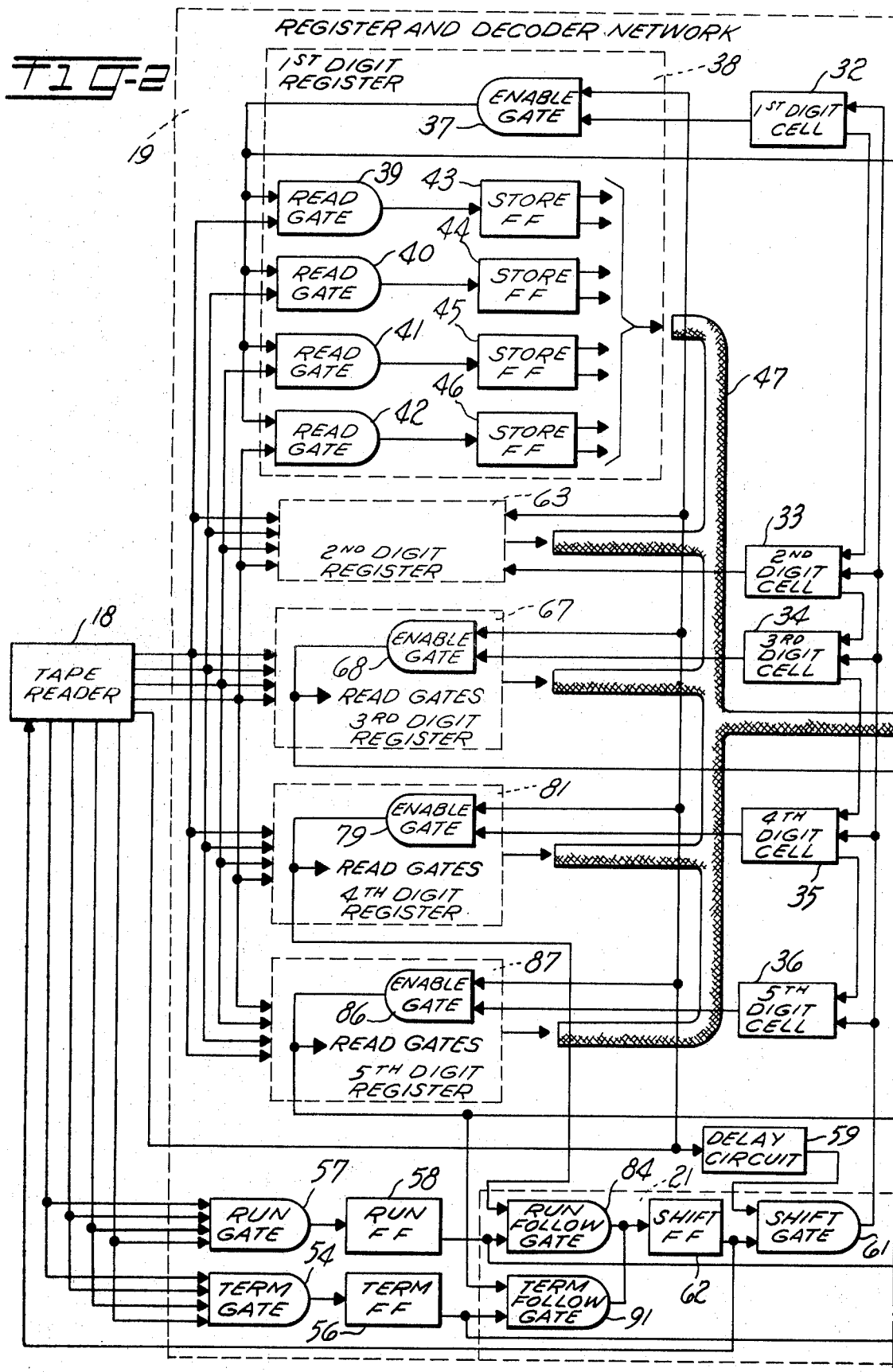

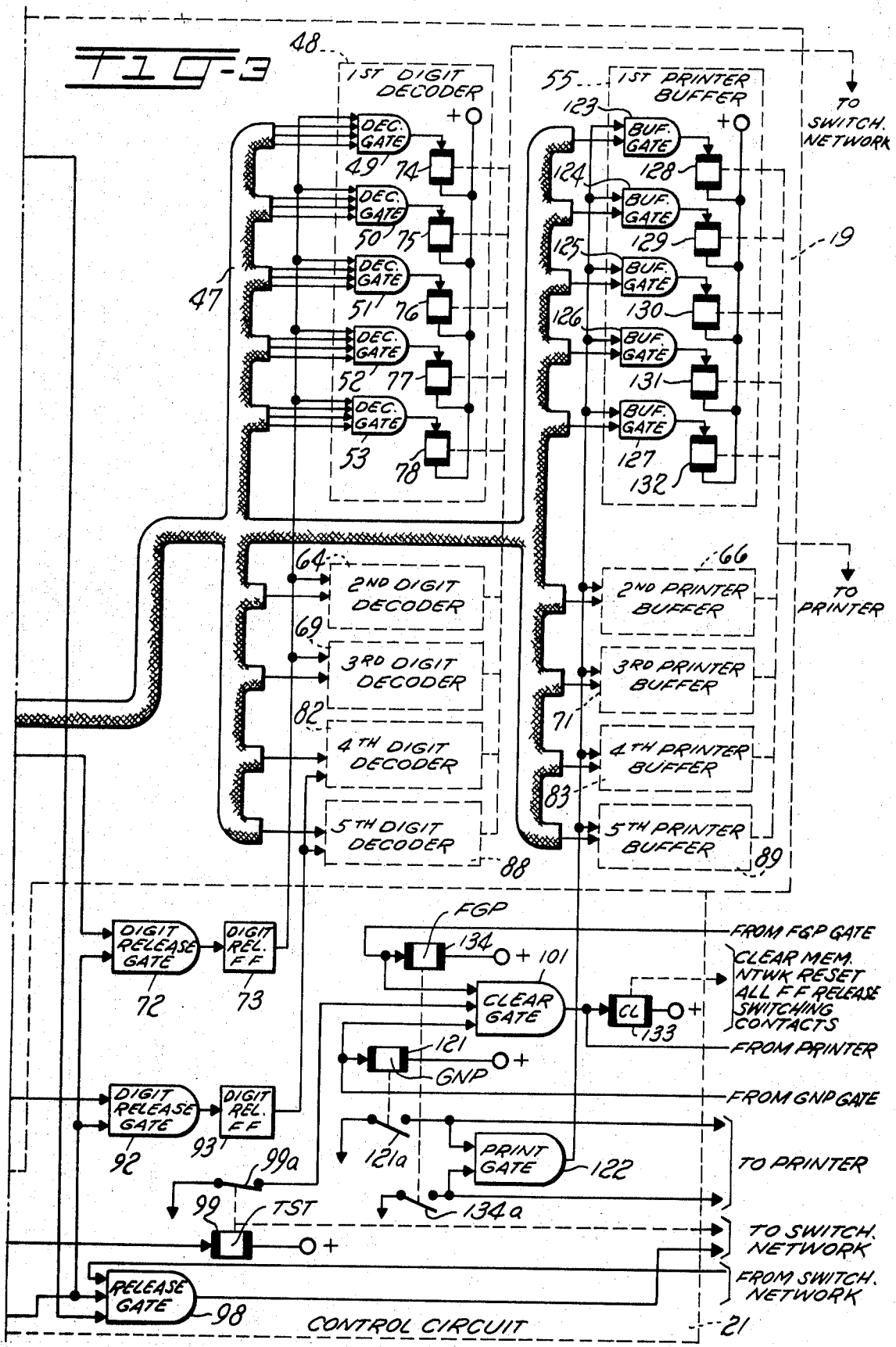

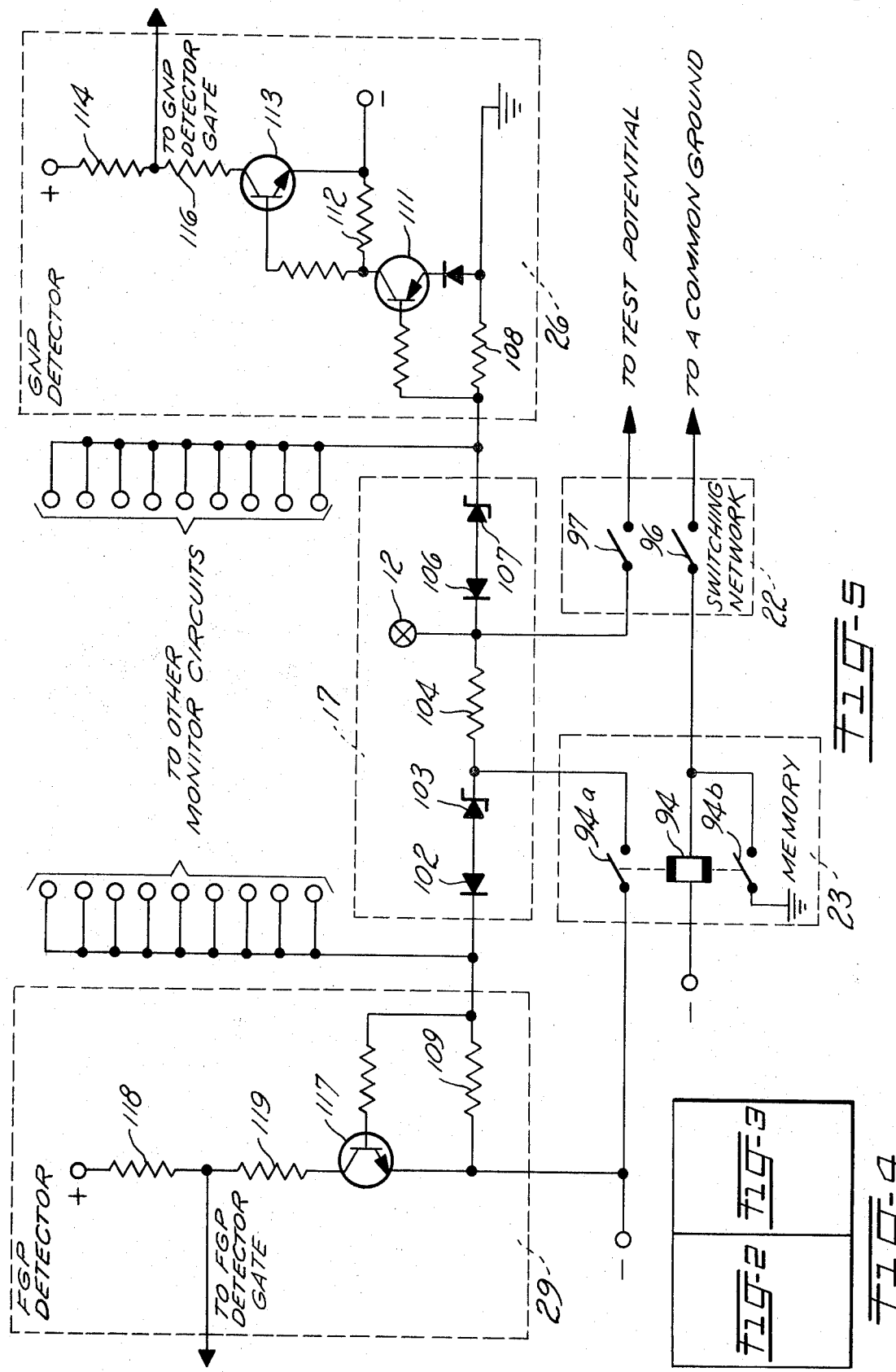

3,535,633
SYSTEMS FOR DETECTING DISCONTINUITY IN SELECTED WIRING CIRCUITS AND ERRONEOUS CROSS CONNECTIONS BETWEEN SELECTED AND OTHER WIRING CIRCUITS
Joseph R. Fallon, Pickerington, Ohio, assignor to Western Electric Company, Incorporated, New York, N.Y., a corporation of New York
Filed June 21, 1967, Ser. No. 647,806
Int. Cl. G01r 31/02
U.S. Cl. 324—73                                                                 3 Claims

ABSTRACT OF THE DISCLOSURE

Electrical systems for detecting discontinuity and erroneous cross connections of a wire run consisting of circuit wiring connected between selected terminals of a multiple terminal network includes a monitoring circuit connected to each terminal for continuously observing the condition of the associated terminal during a test period. A tape reader feeds control information into the system to select a set of terminals associated with a given selected wiring circuit from a plurality of such circuits. A test potential is applied to the selected circuit and each monitoring circuit associated with one of the terminals of the selected circuit observes whether the associated terminal is connected to the test potential. If any of the monitoring circuits associated with the terminals of the selected circuit do not observe the presence of the test potential on the associated terminals, discontinuity in the selected circuit is apparent. The remaining monitor circuits observe terminals externally of the selected circuit to determine if any of the external terminals are connected to the test potential. If the test potential does appear on any of the external terminals, it is an indication that at least one of the external terminals is erroneously connected to the selected circuit. Detectors respond to observations by the monitoring circuits to provide indications of the discontinuity and erroneous wiring conditions that exist during the testing of each selected circuit.

BACKGROUND OF THE INVENTION

Field of the invention

This invention relates to systems for detecting discontinuities and erroneous cross connections of circuits of a network and more particularly relates to electrical testing systems for detecting discontinuities in a circuit selected from a plurality of circuits simultaneously with the detection of undesirable wiring connected between the selected circuit and circuits external of the selected circuit.

Description of the prior art

In the manufacture of complicated electronic systems, it is frequently necessary to provide a plurality of terminations extending from the system to facilitate the connecting of the numerous circuits within the system. Much of the wiring required to complete the connections is accomplished manually where several terminations may be connected in a common circuit, often referred to as a wire run.

Due to the necessity of providing a plurality of terminals in a confined space, the numerous wire runs eventually become a maze of wires which lose their visual identity with respect to the associated wire runs. It would be extremely difficult and prohibitive, from a time standpoint, to electrically test each wire run by manual or even automatic point-to-point testing for discontinuity in selected wire runs and undesirable connections between selected wire runs and terminals of external wire runs.

In the past, scanning techniques have been employed to selectively test a selected terminal with all other terminals where control information instructs the system which terminals should be connected. In addition this technique has been applied to the testing of wire runs. However, where a large number of terminations and wire runs are involved, considerable time is required to accomplish the scanning operation.

SUMMARY OF THE INVENTION

It is, therefore, an object of this invention to provide new and improved systems for detecting discontinuity and erroneous cross connections of circuits of a network.

Another object of this invention is the provision of new and improved systems for detecting discontinuity in selected circuits of a network simultaneously with the detection of erroneous cross connections between the selected circuits and external circuits of the network.

Still another object of this invention is the provision of new and improved systems for detecting discontinuity and erroneous cross connections of circuits of a network which includes a system for checking the continuity of a preselected circuit of the network and a monitoring circuit associated with each terminal of the network externally of the preselected circuit for continuously monitoring the electrical condition of the external terminal while the preselected circuit is being tested for discontinuities.

With these and other objects in view, the present invention contemplates a system for detecting discontinuity and erroneous cross connections in circuits of a network and includes a plurality of monitoring circuits corresponding in number to the number of terminals of the network with each monitoring circuit connected to an associated terminal. An information media provides controlling information to the system for controlling switching means to select those terminals associated with the selected circuit to be tested for discontinuity. The monitoring circuits associated with the terminals of the selected circuit are selectively conditioned to observe the selected circuit for discontinuity. The remaining monitoring circuits are conditioned simultaneously continuously to observe the remaining terminals of the network externally of the preselected circuit to detect erroneous cross connections between the selected circuit and external terminals which are not associated with the selected circuit.

Other objects and features of the present invention will be more readily understood from the following detailed description of a specific embodiment thereof when read in conjunction with the appended drawings.

BRIEF DESCRIPTION OF THE DRAWINGS

FIG. 1 is a block diagram showing an electrical testing system embodying certain features of the present invention;

FIGS. 2 and 3 are schematic diagrams showing storage, gating and control circuits of selected portions of the circuits of FIG. 1;

FIG. 4 is a block diagram showing how FIGS. 2 and 3 are arranged and interconnected to form a portion of the testing system of FIG. 1, and FIG. 5 is a schematic diagram showing a monitoring circuit and portions of other associated circuits embodying certain features of the invention.

DETAILED DESCRIPTION

Referring to FIG. 1, there is shown a fragmentary portion of a housing, designated generally by the reference numeral 11, from which a plurality of terminals 12—12 project. The terminals 12—12 are connected to various circuits of an electronic network to be tested, which is designated generally by the numeral 10, and extend from a common side 13 of the housing 11 in a matrix arrangement where one terminal appears at each crosspoint of the matrix. A plurality of wires 14—14 are connected between selected ones of the terminals 12—12 to provide connections between various circuits within the electronic network 10. Each of the terminals 12—12 is assigned a code designation which identifies the particular terminals and permits a wiring operator to select the terminals between which the wires 14—14 should be connected. In addition, each selected group of terminals 12—12 which are connected together as a circuit by a plurality of the wires 14—14 are designated by a code number which is referred to as a wire run.

The wiring operator uses a wiring chart which provides instructions in accordance with the code designations of the terminals 12—12 which are to be selected for each wire run. In addition, as noted, each wire run is indicated by the wire run code designation. Subsequent to the completion of the wiring between the selected terminals 12—12 of all of the coded wire runs, the wiring must be tested to determine whether the plurality of wires 14—14 have been connected properly between the selected terminals of the plurality of coded wire runs. In addition, a test is conducted to determine whether any terminals 12—12, which are not within the selected wire run, are erroneously connected to the selected wire run. Further, a test may be conducted to determine whether any of the wires 14—14 are connected to terminals 12—12 which are not supposed to have any wires connected thereto.

To facilitate the testing procedure, a testing system, designated generally by the reference numeral 16, includes a plurality of monitor circuits, designated generally by the reference numerals 17—17, which correspond in number to the plurality of terminals 12—12 of the electronic network. Each of the monitor circuits 17—17 is connected to an associated one of the terminals 12—12 of the electronic network 10 through conventional innerconnecting facilities. The monitor circuits 17—17 monitor the conditions of the associated terminals 12—12 and produce output pulses when undesirable conditions are detected.

Generally, one coded wire run is selected by the system 16 and a test ground is applied to the selected wire run. Each of the monitor circuits 17—17 detects the condition of the associated terminal 12. If any of the wires 14—14 of the selected wire run are missing, or are improperly connected to the associated terminals of the selected wire run, an open circuit in the selected wire run is apparent. The associated monitor circuits 17—17 respond by producing output pulses indicative of any open circuit conditions in the selected wire run. If any of the remaining terminals 12—12 externally of the selected wire run are erroneously connected to the terminals of the selected wire run, the associated monitor circuits 17—17 of the erroneously connected terminals produce output pulses indicative of the faulty condition. The output pulses are developed logically and the logic may be analyzed to determine the type of faulty condition and facilitate an indication thereof.

The testing system 16 includes a tape reader 18, such as a Model CX Tape Reader manufactured by the Teletype Corporation of Skokie, Ill., for reading information stored on an information storage media such as a punched paper tape (not shown). The information storage media provides instructions for the testing system in the selection of the terminals 12—12 of the coded wire runs which are to receive a test potential. After the terminals 12—12 have been connected to the testing system 16 through conventional connecting facilities, the tape reader 18 is operated and begins reading blocks of information stored by the tape in code designations in the form of digits which represent crosspoint selections of the terminals 12—12. The vertical columns of the terminals 12—12 are provided with a three-digit code designation while the horizontal rows of the terminals are provided with a two-digit code designation. Therefore, the selection of each of the terminals 12—12 requires a total of five digits. The code designation of each of the wire runs is represented by a four-character code.

Upon operation of the tape reader 18, the first three digits are fed successively into a register and decoder network 19 and are stored in the network temporarily. The tape reader 18 also feeds information into the register and decoder network 19 which informs the test system 16 that a terminal code is being read by the tape reader which is represented by five digits. This information is coupled to a control circuit 21 which, upon the reception of the third digit by the register and decoder network 19, provides a release pulse which facilitates the feeding of the information of the first three digits, stored in the register and decoder network, to a switching network 22. The switching network 22 includes a conventional crossbar switch such as a type 324 Crossbar Switch manufactured by the Western Electric Company, Incorporated, New York, N.Y., and includes a plurality of crosspoints wherein each crosspoint is provided with a plurality of switching paths. The switching network 22 includes a plurality of select magnets (not shown) for selecting one of a plurality of rows of crosspoint contacts of the switching network. In addition, the switching network 22 includes a plurality of hold magnets (not shown) which facilitates the selection of one of a plurality of columns of crosspoints of the switching network. Hence, the operation of a selected select magnet and a selected hold magnet facilitates the closure of contacts at a given crosspoint of the crossbar switch.

When the first three digits of the five-digit terminal code are released from the register and decoder network 19 and are fed to the switching network 22, a translation circuit (not shown) within the switching network facilitates the application of operating potential to one of the select magnets in accordance with the coded information of the three digits.

Simultaneously, the tape reader 18 continues to feed information into the register and decoder network 19 in the form of the fourth and fifth digit of the terminal selection. The register and decoder network 19 still retains the information indicating that a terminal code is being read by the tape reader 18. When the fifth digit has been stored within the register and decoder network 19, the control circuit 21 feeds a release pulse to the register and decoder network to facilitate the release of the fourth and fifth digit information which is then fed to the switching network 22. The information of the fourth and fifth digits is coupled to the translation circuit of the switching network 22 which converts this information into a pulse for selecting one of the hold magnets. When the fifth digit of the five-digit terminal code is stored in the register and decoder network 19, this information is coupled to the control circuit 21 which develops a stop pulse for the tape reader 18 to momentarily stop the operation of the tape reader so that the flow of information from the tape reader into the register and decoder network is stopped. The cooperation of the selected select magnet and hold magnet facilitate the closure of contacts of a selected crosspoint. The select magnet can be subsequently released and the hold magnet will hold the selected crosspont in the operated condition.

One of the circuit paths completed by the closure of the selected crosspoint of the switching network 22 provides an operating pulse for one of a plurality of memory cells (not shown) connected at crosspoints of a memory matrix n a memory 23. Each memory cell of the memory 23 is provided with a self-locking circuit which facilitates the retention of the selected memory cells in the operated state after the operating pulse from the switching network 22 has been removed. Operation of the selected memory cell in the memory 23 facilitates the application of an operating potential to one of the monitor circuits 17—17 associated with the selected memory cell.

Since each of the monitor circuits 17—17 is connected to an associated one of the terminals 12—12, the application of a monitoring potential to one of the monitor circuits through the memory 23 facilitates the selection of one of the terminals of a selected wire run in accordance with the five-digit information fed into the test system 16 by the tape reader 18.

Upon the closure of another set of contacts of the selected crosspoint of the switching network 22, a pulse is coupled to the control circuit 21 from the switching network to indicate the selection of the crosspoint. This information will be utilized subsequently to release the hold magnet which is holding the selected crosspoint in the operated condition. The closure of this pair of contacts of the selected crosspoint of the switching network 22 is also coupled to the control circuit 21 and through the control circuit to the register and decoder network 19 to reset individual circuits within the register and decoder network and the control circuit. When the register and decoder network 19 and the control circuit 21 are reset by the pulse from the switching network 22, the stop pulse from the control circuit to the tape reader 18 is removed and the tape reader starts to read the first digit of the next code stored in the tape.

As the first digit of the next code is read by the tape reader 18, the information is again stored in the register and decoder network 19 and an indication is provided by the information read from the tape whether the code now being fed into the register and decoder network is a terminal code or a wire run code. If a terminal code is being fed from the tape reader 18 to the register and decoder network 19, pulses are coupled from the register and decoder network to the control circuit 21 which combine with the release pulse coupled through one of the closed pair of contacts of the previously selected crosspoint of the switching network 22 to facilitate the development of a release pulse within the control circuit which is coupled to and releases the hold magnet of the previously selected crosspoint. At this time, the previously selected crosspoint is released. Due to the inherent storing features of the memory 23, the selection information previously coupled to the memory from the switching network 22 in the selection of the first monitor circuit 17, and hence the first terminal 12 of the selected wire run, is retained by the memory.

The five digits of the second terminal selection are fed into the test system 16 in the same manner as the first terminal selection information. This procedure is repeated until all of the terminals 12—12 of the selected wire run have been selected through the memory 23 and the associated monitor circuits 17—17. It is noted that the selected crosspoint associated with the selection of each coded terminal is not released until the tape reader 18 begins to read the information relating to the first digit of the next block of coded information. As noted previously, if the next block of information is another terminal selection of the selected wire run, the preceding selected crosspoint of the switching network 22 is released. However, if the block of information presently being read by the tape reader 18 is a wire run code, represented by four char- decoder network 19 and subsequently to the control circuit 21.

The absence of an indication from the register and decoder network 19 that a terminal code is being read precludes the development of a release pulse within the control circuit for releasing the previously selected crosspoint of the switching network 22 whereby the information associated with the last selected terminal is retained within the switching network. Since the wire run code information is the last block of information to be fed from the tape reader 18 to the test system 16 in the selection of a given wire run, the last selected crosspoint of the switching network 22 associated with the selection of the last terminal 12 is held in the operated condition by the associated hold magnet. When the control circuit 21 receives a pulse from the register and decoder network 19 indicating that a wire run code is being read by the tape reader 18, the control circuit controls a pair of contacts within the switching network 22 to facilitate the application of a test potential from a test potential source 24 to the last selected terminal 12 of the selected wire run through the switching network. Since all of the terminals 12—12 of the selected wire run are supposed to be connected by the wires 14—14, the test potential should appear on each of the terminals of the selected wire run.

Simultaneously, each of the monitor circuits 17—17 observes the condition of the associated terminals 12—12. If an open circuit appears in the selected wire run, each of the monitoring circuits 17—17 associated with the selected terminals 12—12 which are not connected to the test potential develops a pulse indicating that the test potential, in the form of ground, is not present. This pulse is coupled to a ground-not-present (GNP) detector 26 which detects the ground-not-present condition observed by the associated monitor circuits 17—17. The GNP detector 26 produces a pulse which is coupled to a GNP detector gate 27.

When the control circuit 21 controlled the contacts of the switching network 22 to facilitate the application of the test potential of the source 24 to the next terminal 12 of the selected wire run, contacts internal of the control circuit were closed to facilitate the application of an enabling potential to the GNP detector gate 27. Therefore, when the GNP detector 26 produced a pulse indicating a ground-not-present condition in the selected wire run, the developed pulse of the GNP detector and the enabling pulse from the control circuit 21 is sufficient to enable the GNP detector gate 27 to produce an output pulse which is fed to the control circuit.

Upon reception of the indication of a ground-not-present condition in the selected wire run, the control circuit 21 controls a printer 28, such as a Model B-1200 printer manufactured by Franklin Electronics Company, Bridgeport, Pa. The information relating to the code designation of a selected wire run remains stored in the register and decoder network 19 as previously described. This stored information indicating the wire run code is coupled from the register and decoder network 19 to the printer 28. When a ground-not-present condition exists in the selected wire run and the control circuit 21 provides a controlling pulse for operating the printer 28 in accordance with the undesirable condition, the printer will print out the four-digit code designation of the selected wire run as stored in the register and decoder network 19. In addition, the printer 28 will also print out a code symbol indicating a ground-not-present condition existing in the selected wire run.

While the monitor circuits 17—17 associated with the terminals 12—12 of the selected wire run are observing the condition of the associated terminals, the remaining monitor circuits are simultaneously observing their associated nonselected terminals. If any of the nonselected terminals are connected to the test potential, for example, through the selected wire run, the associated monitor circuit 17 observes a condition referred to as a false-ground-present (FGP). If such a condition exists on one or more of the nonselected terminals 12—12, that is, terminals other than the terminals associated with the selected wire run, the associated monitor circuits 17—17 produce output pulses which are coupled to an associated FGP detector 29. The FGP detector 29 produces a pulse which is coupled to a FGP detector gate 31 simultaneously with the same enabling pulse which is coupled to the GNP detector gate 27 from the control circuit 21 to enable the FGP detector gate 31 to produce a pulse indicating the presence of a false-ground-present condition associated with the selected wire run. This information indicates that at least one of the nonselected terminals 12—12 is connected to the selected wire run. When the output pulse of the FGP detector gate 31 is coupled to the control circuit 21, the control circuit controls the printer 28 in the same manner as previously described wherein the printer prints the code designation of the selected wire run stored in the register and decoder network 19 and also prints a code symbol indicating the false-ground-present condition.

If ideal conditions exist in the testing of the selected wire run, no output pulses will be developed by the GNP detector gate 27 and the FGP detector gate 31. The logic of this condition is detected by the control circuit 21 to develop a control pulse which is coupled to the memory 23 to facilitate the clearing of all of the information previously stored in the memory thereby releasing all of the monitor circuits 17—17 previously selected through the memory and associated with the selected wire run. In addition, all circuits within the system 16 are reset for subsequent reception of the coded information from the tape reader 18 and all contacts in the switching network 22 are released. Thus, while each selected wire run is tested for continuity, the remaining external or nonselected terminals 12—12 are tested simultaneously for erroneous connections to the selected wire run. The simultaneous monitoring and detecting technique eliminates the necessity of scanning all of the terminals 12—12 of the network during successive periods when each of the terminals or wire runs is examined.

Referring now to FIGS. 2 and 3, the register and decoder network 19 includes first, second, third, fourth and fifth digit flip-flop cells 32, 33, 34, 35 and 36, respectively. Initially, the first digit flip-flop cell 32 is in the set condition to provide an output pulse to an enable gate 37 of a first digit register 38. During operation of the tape reader 18, a mechanism within the reader moves a magnetic element periodically adjacent to a pickup facility whereby a magnetic pulse is developed. When the reading process is stopped, the mechanism is disconnected mechanically, by declutching, from the reading facilities of the tape reader 18. However, the mechanism continues to move and the magnetic pulse is periodically developed. Each time the tape reader 18 reads a digit stored on the tape, the magnetic pulse is developed by the mechanism within the tape reader and is coupled to the enable gate 37. When the output pulse of the flip-flop cell 32 and the developed magnetic pulse from the tape reader 18 are simultaneously applied to the enable gate 37, the enable gate develops an enabling pulse which is applied to each of four read gates, 39, 40, 41 and 42 of the first digit register 38. During the period when the enabling pulse is coupled from the enable gate 37 to the read gates 39 to 42, inclusive, the first digit information is coupled from the tape reader 18 to the read gates. Depending upon the first digit information which is coupled from the tape reader 18 to the read gates 39 to 42, inclusive, the read gates will be enabled selectively to produce output pulses which are coupled to associated store flip-flops 43, 44, 45 and 46. The output pulses from the selected read gates 39, 40, 41 and 42 set the associated store flip-flops 43, 44, 45 and 46, respectively.

The combination of states of the store flip-flops 43 to 46, inclusive, establishes output patterns of the flip-flops which, in combined form, indicate the numerical value of the first digit. The pattern of the states of the store flip-flops 43 to 46, inclusive, is retained in this condition even after the enabling pulses have been removed from the associated read gates 39 to 42, inclusive. The information set in the store flip-flops 43 to 46, inclusive, in terms of the first digit is coupled though a cable harness 47 to a first digit decoder 48 and is coupled selectively directly into a series of decoder gates 49, 50, 51, 52 and 53. Since the decoder gates 49 to 53, inclusive, each require an additional enabling pulse to develop an output pulse, no output pulses are produced by the decoder gates of the first digit decoder at this time.

The information stored in the first digit register 38, in the form of the first coded digit, is also coupled to a first printer buffer 55. However, the printer buffer 55 requires additional enabling pulses to provide controlling outputs to the printer 28. Therefore, the stored information in the first digit register 38 is merely presented to the first printer buffer 55 at the this time.

In addition to the information read by the tape reader 18 indicating the first digit, the tape reader simultaneously reads information from the tape indicating the type of code designation which is being read, that is, a four-character wire run code of a five-digit terminal code. Assuming that the code designation is a five-digit code, the information indicates the selection of one of the terminals 12—12 of the selected wire run. This information is coupled from the tape reader 18 to a terminal gate 54 in the register and decoder network 19. Upon reception of the information from the tape reader 18, the terminal gate 54 is enabled to develop an output pulse which is coupled to and sets a terminal flip-flop 56. If the information from the tape reader 18 indicates that a wire run code is being fed into the register and decoder network 19, the information is fed to a run gate 57 in the register and decoder network 19 which develops an output pulse which is coupled to an sets a run flip-flop 58.

When the developed magnetic pulse is fed from the tape reader 18 to the register and decoder network 19 and subsequently to the enable gate 37, it is also coupled to a delay circuit 59 which delays the pulse for a predetermined time before feeding the pulse to a shift gate 61 in the control circuit 21. A shift flip-flop 62, also in the control circuit 21, is normally set to develop an enabling pulse which is coupled to the shift gate 61. When the delay pulse from the delay circuit 59 and the enabling pulse from the shift flip-flop 62 are applied simultaneously to the shift gate 61, the shift gate develops a shift pulse which is coupled to the first through fifth digit cells 32 to 36, inclusive, in the register and decoder network 19.

In order to set the flip-flop cells 32 to 36, inclusive, each flip-flop cell must receive coincidental inputs from the shift gate 61 and the preceding flip-flop cell. Therefore, in order to store the second digit in a second digit register 63, the second digit cell 33 must receive simultaneous inputs from the first digit flip-flop cell 32 and the shift gate 61. When the simultaneous application of these pulses to the second digit flip-flop cell 33 occurs, the second digit register 63 is enabled in the same manner as the first digit register 38 and receives the coded information from the tape reader 18 for storage in the store flip-flops of the second digit register. This information is coupled through the cable harness 47 to a second digit decoder 64 and is also coupled through the cable harness to a second printer buffer 66. The second digit decoder 64 is identical in circuit structure to the first digit decoder 48 and also requires an additional enabling pulse before the decoded information can be utilized to control portion of the switching network 22.

It is noted that when the tape reader 18 begins to read information from the tape relating to the second digit of the code, the inputs to the terminal gate 54 or the run gate 57, depending upon the code designation being read from the tape reader 18, are no longer present. Therefore, the particular gate, 54 or 57, is disenabled. However, the information relating to the type of code presently being read by the tape reader 18 remains stored in the register and decoder network 19 in the form of the set terminal flip-flop 56 or the set run flip-flop 58.

After the second digit of the code has been stored in the second digit register 63, the third digit flip-flop cell 34 is set to enable a third digit register 67 to receive the coded information for the third digit from the tape reader 18. When the third digit cell 34 is set, an enabling pulse is developed by the cell and coupled to an enabling gate 68 and is applied simultaneously with the periodically magnetically developed pulse from the tape reader 18. Upon the simultaneous application of these pulses, the enabling gate 68 is enabled to develop an output pulse which enables the read gates of the third digit register 67 to receive the coded information of the third digit from the tape reader 18. The information relating to the third digit is stored in the third digit register 67 and is also coupled through the cable harness 47 to a third digit decoder 69 and a third printer buffer 71. Since both the third digit decoder 69 and the third printer buffer 71 require additional enabling pulses, no information is coupled to the switching network 22 or the printer 28.

The output of the enable gate 68 is also coupled to one input of a digit release gate 72 in the control circuit 21. The output of the terminal flip-flop 56 in the register and decoder network 19 is also coupled to an input of the digit release gate 72 whereby the simultaneous application of these two pulses to the digit release gate enables the gate to develop a pulse which is coupled to and sets a digit release flip-flop 73. It is noted that the digit release gate 72 will not be enabled if the code designation being read by the tape reader 18 is a wire run code rather than a terminal code.

When the digit release flip-flop 73 is set, an enabling pulse is coupled to the gates of the first, second and third digit decoders 48, 64 and 69, respectively. Since the digit decoders are identical in structure, a discussion of the operation of the first digit decoder 48 will describe the manner in which all of the digit decoders function. When the decoder gates 49 to 53, inclusive, receive the enabling pulse from the digit release flip-flop 73, each of the decoder gates receiving sufficient coded pulses from the first digit register 38 through the cable harness 47 will be enabled to facilitate the application of operating potential to associated relay coils 74 through 78. It is noted that, depending upon the information stored in the first digit register 38, some of the decoder gates 49 through 53 may not be enabled and, consequently, operating potential may not be applied to the associated relay coils 74 through 78. The same pattern of enabling operation occurs in the second digit decoder 64 and the third digit decoder 69.

Contacts of the relays associated with the coils in the first, second and third digit decoders 48, 64 and 69, respectively, appear in the translation circuit of the switching network 22 (FIG. 1) which facilitates the selection and operation of one of the select magnets of the switching network and represents, in the form of a three-digit code, one of the vertical columns of the terminals 12—12 extending from the network housing 11. As previously described, the operated select magnet enables a row of crosspoints one of which will subsequently be closed to select a particular one of the terminals 12—12 through the memory 23.

During this period, the tape reader 18 continues to read information from the tape in terms of the fourth digit. The fourth digit flip-flop cell 35 has been set by the combination of inputs from the third digit cell 34 and the shift gate 61 to develop an enabling pulse for an enabling gate 79 of a fourth digit register 81. The developed magnetic pulse from the tape reader 18 is also applied to the enabling gate 79 whereby the gate is enabled to develop an enabling pulse which is coupled to the read gates of the fourth digit register 81. In this manner, the read gates of the fourth digit register 81 are enabled to receive the information read by the tape reader 18 indicating the coded information of the fourth digit whereby the store flip-flops of the fourth digit register are set to store the fourth digit code information. This information is coupled through the cable harness 47 to a fourth digit decoder 82 and a fourth printer buffer 83. However, both the fourth digit decoder 82 and the fourth printer buffer 83 require additional enabling pulses before controlling outputs can be developed by the decoder and the buffer.

The output of the enabling gate 79 of the fourth digit register 81 is also coupled to a run-follow gate 84 in the control circuit 21. In the event a four-character wire run code is being read by the tape reader 18, the run flip-flop 58 has been set as previously described. The output of the run flip-flop 58 is coupled to the run-follow gate 84 simultaneously with the output of the enabling gate 79 whereby the run-follow gate develops a pulse which is coupled to and sets the shift flip-flop 62. When the shift flip-flop 62 is set, the enabling pulse to the shift gate 61 is removed thereby preventing a shift pulse from being fed to the fifth digit flip-flop cell 36. Since the wire run code designation is a four-character code, the fifth digit cell 36 and the associated fifth digit register 87 are not required.

In addition, the set output of the shift flip-flop 62 is coupled to the tape reader 18 to stop the reading operation. However, the developed magnetic pulses continue to be developed within the tape reader 18 and are applied to the register and decoder network 19. Since the shift gate 61 has been disenabled by the shift flip-flop 62, the continued application of the developed magnetic pulses from the tape reader 18 to the register and decoder network 19 have no affect upon the circuit operation at this time.

Assuming that the code designation presently being read by the tape reader 18 is a five-digit terminal code, the run flip-flop 58 would not have been set and an enabling pulse would not have been applied to the run-follow gate 84 even though the output pulse of the enabling gate 79 was applied to the run-follow gate. Therefore, the shift flip-flop 62 in the control circuit 21 remains in the reset condition and applies an enabling pulse to the shift gate 61. When the output of the delay circuit 59 is coupled to the shift gate 61, the shift pulse is applied to the fifth digit flip-flop cell 36 simultaneously with the input from the fourth digit flip-flop cell 35 whereby the cell 36 is set.

An output is coupled from the set fifth digit cell 36 to an enabling gate 86 of a fifth digit register 87. When one of the periodically developed magnetic pulses from the tape reader 18 next occurs, the enabling gate 86 is enabled to develop an output pulse which is coupled to the read gates of the fifth digit register 87. The read gates of the fifth digit register 87 are enabled upon the reception of the coded information from the tape reader 18 relating to the fifth digit and develop outputs which set, in a selected pattern, the store flip-flops of the fifth digit register. The information stored in the store flip-flops of the fifth digit register 87 is coupled through the cable harness 47 to a fifth digit decoder 88 and a fifth printer buffer 89. However, since both the decoder 88 and the buffer 89 require additional enabling pulses, no controlling outputs are coupled to the respective associated switching network 22 and printer 28.

The output of the enabling gate 86 of the fifth digit register 87 is also coupled to one input of a terminal-follow gate 91 in the control circuit 21. The output of the terminal flip-flop 56 is also coupled to the terminal-follow gate 91 which develops an output pulse. The output pulse developed by the terminal-follow gate 91 is coupled to and sets the shift flip-flop 62 which facilitates the removal of one of the enabling pulses to the shift gate 61 and also provides a stop pulse to the tape reader 18 to stop the reading of information. Since the shift gate 61 is temporarily disenabled by the setting of the shift flip-flop 62, the shifting between the digit flip-flop cells 32 to 36, inclusive, ceases and the register and decoder network 19 is in the condition wherein all five digits of the selected terminal code are now stored within the register and decoder network.

The output of the enabling gate 86 of the fifth digit register 87 is also coupled to another digit release gate 92. The digit release gate 92 also receives an input from the set terminal flip-flop 56 and is thereby enabled to develop a pulse which is coupled to and sets another digit release flip-flop 93. The output of the digit release flip-flop 93 is coupled to the fourth digit decoder 82 and the fifth digit decoder 88 to facilitate the release of the decoded information in the gates of the decoder whereby associated relays are operated and control contacts in the translation circuit of the switching network 22 for the selection of the hold magnet. Upon the selection of the hold magnet and in cooperation with the previously operated select magnet, a given crosspoint of the switching network 22 is selected as previously described.

After the fourth and fifth digit decoder control relay contacts are operated in the translation circuit of the switching network 22, the crosspoint of the switching network associated with the terminal 12 being selected is operated thereby closing a plurality of contacts associated with the selected crosspoint. The inherent features of the crossbar switch of the switching network 22 facilitate the release of the select magnet. However, the hold magnet remains in the operated condition to retain the selected crosspoint in the operated condition.

Referring now to FIG. 5, one of the monitor circuits 17—17 is shown connected to the associated terminal 12. In addition, one memory cell of the memory 23 includes a coil 94 of a memory relay and an associated pair of normally open contacts 94a and 94b. A portion of the switching network 22 is also shown including a pair of normally open contacts 96 and 97. When the selected crosspoint of the switching network 22 is operated in accordance with the previously described operation, the contact 96 is closed at the selected crosspoint and facilitates the application of ground to the selected coil 94 of the memory relay within the memory 23. The opposite side of the coil 94 is connected to a negative potential thereby facilitating the operation of the memory relay associated with the coil. When operating potential is applied to the coil 94, the associated contact 94a is closed to connect a negative potential, which forms one side of the test potential, to the associated monitor circuit 17. In addition, the associated contact 94b is closed to facilitate the connection of ground to the existing ground side of the coil 94. When the selected crosspoint of the switching network 22 is subsequently released, the closed contact 94b facilitates the continued application of operating potential to the relay coil 94 thereby locking the selected memory relay in the operated condition and storing the terminal selection information in the selected memory cell of the memory 23.

Circuit diagrams of the GNP detector 26 and the FGP detector 29 are also shown in FIG. 5 connected to an associated one of the monitor circuits 17—17. It is noted that each of the detectors 26 and 29 are connected to a plurality of monitor circuits 17—17. In the event any or all of the monitor circuits 17—17 detect faulty conditions relating to their associated terminals 12—12, each detector 26 and 29 detects each and every faulty condition even though only one GNP detector 26 and one FGP detector 29 are used with a plurality of the monitor circuits 17—17.

One of the circuits closed by the selected crosspoint provides a resetting potential for all of the flip-flops in the register and decoder network 19 and the control circuit 21 except for the first digit flip-flop cell 32 which is set. When the shift flip-flop 62 is reset, the output of the flip-flop controls the tape reader 18 by removing the stop pulse so that the reader can read the next block of coded information. Assuming that the next block of information is a five-digit terminal code, the terminal gate 54 is enabled to develop the pulse for setting the terminal flip-flop 56. In addition, the application of the developed magnetic pulse from the tape reader 18 to the enable gate 37 simultaneously with an input from the first digit flip-flop cell 32 enables the gate 37 to develop an output pulse. The output pulse of the enable gate 37 is coupled to the read gates 39 to 42, inclusive, of the first digit register 38 as described previously thereby initiating the procedure for storing the five digits of the next terminal code information in the register and decoder network 19.

When the selected crosspoint for the previously selected terminal 12 was operated, one of the plurality of closed circuit paths associated with the crosspoint facilitated the application of an enabling potential to a release gate 98 in the control circuit 21. The release gate 98 also receives inputs from the enable gate 37 of the first digit register 38 and the terminal flip-flop 56 which facilitate the enabling of the release gate to develop a pulse which is coupled to the circuit of the selected hold magnet associated with the previously selected terminal 12 to release the hold magnet thereby releasing the previously selected crosspoint. It is noted, as previously described, that the previous selection of the terminal 12 is stored in the memory 23 in the form of the locked memory relay associated with the memory cell which includes the relay coil 94 (FIG. 5). It is further noted that if the next coded designation, being read by the tape reader 18, had been a wire run code, the terminal flip-flop 56 would not have been set and the release gate 98 would not have been enabled to release the previously selected hold magnet. This is an indication that the code designation presently being read by the tape reader 18 is a wire run code and that the preivously selected terminal 12 is the last terminal of the selected wire run. In addition, the release gate 98 is not enabled until the first digit of the next code designation is being stored in the first digit register 38. This is accomplished by requiring enabling pulses from the enable gate 37 and terminal flip-flop 56 to enable the release gate 98.

Referring now to FIGS. 2 and 3, assuming that the present code designation being read by the tape reader 18 from the tape is a four-character wire run code, the run flip-flop 58 in the register and decoder network 19 is set. The output of the run flip-flop 58 facilitates the application of operating potential to a test relay coil 99 in the control circuit 21. The test relay coil 99 controls contacts which enable contacts in the switching network 22, for example, the contact 97 (FIG. 5), to facilitate the application of the test potential, in the form of ground, on the last selected terminal 12 of the selected wire run. In addition, with the application of operating potential to the test relay coil 99, another associated contact 99a is opened to remove ground from an input to clear gate 101.

Referring now to FIG. 5, the contact 97 is closed initially upon operation of the selected crosspoint within the switching network 22. Subsequently, when operating potential is applied to the test relay coil 99, a ground is applied to the last selected terminal 12 through the associated monitor circuit 17. If continuity exists in each wire 14 connected between the terminals 12—12 of the selected wire run, each of these selected terminals will also be at ground. In addition to the application of ground to each of the selected terminals 12—12, the negative potential is also applied to each of the monitor circuits 17—17 associated with the selected terminals in the manner described previously by the closure of the memory relay contact 94a in the memory 23. The remaining monitor circuits 17—17 will not be connected to either the test potential or the negative side of the supply through the switching network 22 in the memory 23. Therefore, the condition of the monitor circuits 17—17 which are associated with the external or nonselected terminals 12—12 will be as shown in FIG. 5 with the relay contacts 94a and 94b remaining open.

Each monitor circuit 17 includes a diode 102, a Zener diode 103, a resistor 104, a diode 106 and a Zener diode 107 connected in series. The diodes 102 and 106 limit leakage current which may evelop because of the termal effects in the operation of the circuit. The resistor 104 is a current limiting resistance. The Zener diode 103 is associated with the false-ground-present (FGP) detector 29 and will break down in those circuits having ground applied to external or nonselected terminals 12—12. The Zener diode 107 is associated with the ground-not-present (GNP) detector 26 and will break down whenever ground does not appear on the selected terminals 12—12 of the selected wire run.

The negative potential which is connected to the monitor circuit 17 by the closure of the memory relay contact 94a is connected between the current limiting resistor 104 and the FGP breakdown diode 103. The test terminal 12 and the connection for the application of ground through the contact 97 is connected between the current limiting resistor and the diode 106. The series circuit of the monitor circuit 17 is connected in series with a resistor 108 in the GNP detector 26, which is also connected to ground, and is further connected in series with a resistor 109 in the FGP detector 29 which, in turn, is connected to the negative potential. It is noted that the series circuit including the resistors 104, 108 and 109, the diodes 102 and 106 and the breakdown diodes 103 and 107 are connected between the negative potential and ground which would establish a path for current flow. However, the combined breakdown voltage of the Zener diodes 102 and 107 is greater than the potential applied to the circuit between the negative potential and ground. Therefore, no current will flow normally through this circuit.

When one of the terminals 12–12 is selected within a selected wire run, a ground should appear on the selected terminal. If for some reason the selected wire run is open and ground does not appear on the selected terminal, the negative potential which is connected to the monitor circuit 17 through the closed relay contact 94a is sufficient to cause the GNP diode 107 to break down and thus cause current to flow through the resistor 108. The voltage consequently appearing across the resistor 108 is sufficient to bias a transistor 111 in the GNP detector 26 into conduction. As the transistor 111 conducts, a voltage appears across a resistance 112 which sufficiently biases a transistor 113 into conduction. A voltage divider network including resistors 114 and 116 is connected between a positive potential and a negative potential. An output is taken from the voltage divider network between the resistors 114 and 116 and is applied to the GNP detector gate 27 (FIG. 1). As described previously, the output of the GNP detector 26 is coupled to the GNP detector gate 27. The GNP detector gate 27 is enabled by the pulse from the control circuit 21 to develop an output pulse which is coupled to the control circuit as an indication of the ground-not-present condition in the selected wire run.

In the event one of the external or nonselected terminals 12–12 is erroneously connected to the selected wire run, and therefore is connected to ground, the presence of ground on the nonselected terminal causes the FGP Zener diode 103 to break down thereby facilitating curernt flow through the resistor 109. The voltage appearing across the resistor 109 is sufficient to bias a transistor 117 in the FGP detector 29 into conduction. When the transistor 117 conducts, current flows through a voltage divider network including resistors 118 and 119. An output is taken from the voltage divider network, between the resistors 118 and 119, and is applied to the FGP detector gate 31 (FIG. 1) simultaneously with an enabling pulse from the control circuit 21 whereby the gate develops a pulse which is coupled to the control circuit to indicate the false-ground-present condition associated with the selected wire run.

Referring now to FIG. 3, when a ground-not-present condition is indicated, the control circuit 21 receives an input from the ground-not-present gate 27 (FIG. 1) which facilitates the application of the operating potential to a coil 121 of a ground-not-present relay. Upon application of operating potential to the relay coil 121, an associated contact 121a is closed to provide an enabling potential for a print gate 122. The print gate 122 develops a pulse which is coupled to five buffer gates 123 through 127 in the first printer buffer 55 and to identical buffer gates in the second printer buffer 66, the third printer buffer 71, the fourth printer buffer 83 and the fifth printer buffer 89. Depending upon the stored information appearing in the first through the fourth digit registers 38, 63, 67 and 81, respectively, selected buffer gates, for example, 123 through 127, are enabled to facilitate the application of operating potential to associated relay coils, for example, 128 through 132. Similar relay coil control occurs in the second, third and fourth printer buffers 66, 71 and 83, respectively. Upon the application of operating potential to the relay coils of the printer buffers 55, 66, 71, 83 and 89, contacts within the printer 28 (FIG. 1) are controlled thereby to facilitate the printing of the wire run code stored in the register and decoder network 19. In addition, upon the closure of the relay contact 121a, a potential is coupled to the printer 28 (FIG. 1) from the control circuit 21 to facilitate the printing of a code symbol which indicates that a ground-not-present condition exists with respect to the selected wire run. Upon completion of the printing of the wire run code designation and the code symbol, operating potential is coupled from the printer 28 (FIG. 1) to a coil 133 of a clear relay in the control circuit 21. When the clear relay is operated, circuits (not shown) are operated to clear the memory 23 by releasing the relay coils, for example, coil 94 (FIG. 5), of the memory cells, resetting all flip-flops of the test system 16 and releasing all contacts of the switching network 22.

It is noted that the fifth printer buffer 89 is not utilized at the time when the wire run code designation is printed because the wire run code only contains four characters. However, in conducting other types of tests, it may be necessary to print out the terminal code designation which is a five-digit code.

If a false-ground-present condition exists, a signal is coupled from the FGP detector gate 31 (FIG. 1) to the control circuit 21 and facilitates the application of operating potential to a coil 134 of a FGP relay. Upon the application of the operating potential to the relay coil 134, an associated contact 134a is closed whereby enabling potential is applied to the print gate 122.

When the enabling potential is applied to the print gate 122, the print gate develops a pulse which is coupled to the buffer gates of the first, second, third, fourth and fifth printer buffers 55, 66, 71, 83 and 89, respectively. Depending upon the stored information appearing in the first through the fourth digit registers 38, 63, 67 and 81, respectively, selected buffer gates are enabled to facilitate the application of operating potential to associated relay coils of the printer buffers 55, 66, 71 and 83. When operating potential is applied to the selected relay coils of the printer buffers 55, 66, 71 and 83, selected contacts are closed in the printer 28 (FIG. 1) for printing out the wire code designation stored in the register and decoder network 19. In addition, when the contact 134a is closed, a potential is coupled to the printer 28 (FIG. 1) from the control circuit 21 to facilitate the printing of a code symbol which indicates that a false-ground-present condition exists with respect to the selected wire run. Upon completion of the print, operating potential is applied to the clear relay coil 133 to facilitate the clearing of the various circuits in the test system 16 as described previously.

The presence of ground through the normally closed contact 99a to one of the inputs of the clear gate 101 precludes the enabling of the clear gate during the selection of the terminals 12—12 associated with the selected wire run. When the operating potential is applied to the test relay coil 99, ground is removed from the input of the clear gate 101. The application of positive potentials through the GNP and FGP coils 121 and 134, respectively, to the inputs of the clear gate 101 is sufficient to enable the gate when the contact 99a is opened so that operating potential is applied to the clear relay coil 133 to clear the various circuits of the test system 16, as described previously. Even though the clear gate 101 is enabled when the test relay contact 99a is opened, a period of time elapses before the clear relay is operated. During the lapsed period, ground-not-present and false-ground-present conditions are detected, if present, before the clear relay is operated. If discontinuities or erroneous wiring are not apparent, the clear relay will operate as a result of the application of operating potential to the coil 133.

In the event some of the terminals 12—12 are not utilized during the wiring of the plurality of wire runs by the wiring operator, a test may be conducted to determine whether any of the unwired terminals 12—12 are connected to any other terminals. The test system 16 receives the individual code designations of each unwired terminal 12 and selectively and sequentially connects each unwired terminal to ground and monitors all of the terminals in a manner similar to the monitoring of the selected wire runs, as described previously. In the event the selected unwired terminal 12 is connected errroneously to any of the other terminals, a false-ground-present condition is detected and a printing of the unwired terminal code designation occurs in a manner similar to the printing of the wire run code designation, as described previously. However, in this instance, a five-digit code could be printed thereby utilizing the fifth printer buffer 89.

The utilization of the monitoring and detecting techniques as described previously permit rapid testing of a plurality of wire runs associated with a given network. This procedure is advantageous over the scanning technique where a terminal of a network of terminals is selected and the remaining terminals are scanned to detect faulty wiring.

The test system 16 can also test wire runs of successive networks by providing information on the tape which controls additional switching facilities in the switching network 22 so that the monitor circuits 17—17 are connected to the additional networks of terminals.

It is noted that while specific features have been described with respect to the various component portions of the testing system 16, other alternatives can be utilized. For example, the switching system 22 could include a relay tree or matrix, a diode tree or a matrix, or a transistor tree or matrix. The memory 23 could include silicon controlled rectifier circuits.

It is to be understood that the above-described arrangements are simply illustrative of the invention. Other arrangements may be devised by those skilled in the art which will embody the principles of the invention and fall within the spirit and scope thereof.

What is claimed is:

1. In a system for testing for a discontinuity in a selected wiring circuit having at least one intermediate terminal, which comprises:
   a plurality of discontinuity detecting circuits each of which are connected to an associated terminal of a corresponding plurality of terminals of the selected wiring circuit, including at least one intermediate terminal thereof,
   each of the discontinuity detecting circuits including a voltage breakdown device connected at one side thereof to the associated terminal of the selected wiring circuit,
   a shunting circuit which is designed to be connected selectively across the voltage breakdown device of one of the discontinuity detecting circuits,
   means for connecting selectively one of the plurality of terminals of the selected wiring circuit to the shunting circuit and for connecting the shunting circuit across the voltage breakdown device of the discontinuity detecting circuit associated with the one terminal and across the voltage breakdown devices of any other discontinuity detecting circuits which are connected to the one terminal by a continuous portion of the selected wiring circuit, and
   means for applying selectively a breakdown potential across the voltage breakdown device of each of the discontinuity detecting circuits associated with each of the terminals of the selected wiring circuit so that the voltage breakdown device, associated with any of the terminals of the selected wiring circuit having a discontinuous portion of the selected wiring circuit connected between any of the terminals and the terminals connected to the shunting circuit, will breakdown resulting in current flow through the associated voltage breakdown devices indicative of discontinuity in the selected wiring circuit.

2. In a system for testing for a discontinuity in a selected wiring circuit having at least one intermediate terminal and testing simultaneously for an erroneous connection between the selected wiring circuit and a circuit external of the selected wiring circuit, which comprises:
   a plurality of discontinuity detecting circuits each of which are connected to an associated terminal of a corresponding plurality of terminals of the selected wiring circuit, including at least one intermediate terminal thereof,
   each of the discontinuity detecting circuits including a voltage breakdown device connected at one side thereof to the associated terminals of the selected wiring circuit,
   a shunting circuit which is designed to be connected selectively across the voltage breakdown device of one of the discontinuity detecting circuits,
   means for connecting selectively one of the plurality of terminals of the selected wiring circuit to the shunting circuit and for connecting the shunting circuit across the voltage breakdown device of the discontinuity detecting circuit associated with the one terminal and across the voltage breakdown devices of any other discontinuity detecting circuits which are connected to the one terminal by a continuous portion of the selected wiring circuit,
   means for applying selectively a breakdown potential across the voltage breakdown device of each of the discontinuity detecting circuits associated with each of the terminals of the selected wiring circuit so that the voltage breakdown device, associated with any of the terminals of the selected wiring circuit having a discontinuous portion of the selected wiring circuit connected between any of the terminals and the terminals connected to the shunting circuit, will breakdown resulting in current flow through the associated voltage breakdown devices indicative of discontinuity in the selected wiring circuit, and
   an erroneous connection detecting circuit, connected to at least one circuit externally of the selected wiring circuit,
   the erroneous connection detecting circuit including a voltage breakdown device connected normally to a terminal of the external circuit so that any erroneous connection between the selected wiring circuit and the external circuit facilitates the application of the breakdown potential to the voltage breakdown device of the erroneous connection detecting circuit simultaneously with the application of the breakdown potential to the discontinuity detecting circuits whereby the voltage breakdown device associated with the erroneous connection circuit breaks down and current flows therethrough which is indicative of the erroneous connection.

3. A system for testing for a discontinuity in a selected wiring circuit having at least one intermediate terminal and for testing simultaneously for an erroneous connection between the selected wiring circuit and a circuit external of the selected wiring circuit, which comprises:
   a plurality of monitoring circuits each of which are connected to an associated terminal of a plurality of terminals which include at least three terminals of a selected wiring circuit and at least one terminal external of the terminals of the selected wiring circuit, each of the monitoring circuits including:

a voltage breakdown device associated with the detection of discontinuity in the selected wiring circuit connected at one side thereof to the associated terminal, and a voltage breakdown device associated with the detection of an erroneous connection to the selected wiring circuit connected at one side thereof to the associated terminal, a shunting circuit designed to be connected selectively across one of the voltage breakdown devices of the monitoring circuit connected to at least one terminal of the terminals of the selected wiring circuit, means for connecting selectively the at least one terminal of the selected wiring circuit to the shunting circuit and for connecting the shunting circuit across the voltage breakdown device associated with the at least one terminal and the detection of discontinuity in the selected wiring circuit and across the voltage breakdown devices of any of the remaining monitoring circuits which are connected to the at least one terminal by a continuous portion of the selected wiring circuit, means for shorting selectively the voltage breakdown devices of each of the monitoring circuits associated with the detection of an erroneous connection and which are connected to the terminals of the selected wiring circuit, and means for applying selectively a breakdown potential to all of the voltage breakdown devices, associated with detection of discontinuity, of the monitoring circuits connected to the terminals of the selected wiring circuit so that the voltage breakdown device, associated with any of the terminals of the selected wiring circuit which are connected to the associated monitoring circuits and having a discontinuous portion of the selected wiring circuit connected between any of the terminals and the terminals connected to the shunting circuit, will breakdown resulting in current flow through the associated voltage breakdown device which is indicative of discontinuity in the selected wiring circuit, the voltage breakdown devices, associated with detection of an erroneous connection, of the monitoring circuits associated with any of the terminals of circuits externally of the selected wiring circuit, which are erroneously connected to the selected wiring circuit, having the breakdown potential applied thereto through the erroneous connection so that the erroneous connection voltage breakdown device associated with each of the external terminals connected to selected wiring circuits by an erroneous connection will breakdown resulting in current flow through the voltage breakdown devices associated with an erroneous connection which is indicative of an erroneous connection between the selected wiring circuit and an external terminal.

References Cited

UNITED STATES PATENTS 3,246,240  4/1966  Arnold _____ 324—73
3,414,814  12/1968  Gilbertson _____ 324—73

RUDOLPH V. ROLINEC, Primary Examiner

E. L. STOLARUN, Assistant Examiner

U.S. Cl. X.R.

324—51

UNITED STATES PATENT OFFICE
CERTIFICATE OF CORRECTION

Patent No. 3,535,633      Dated    October 20, 1970

Inventor(s) Joseph R. Fallon

It is certified that error appears in the above-identified patent and that said Letters Patent are hereby corrected as shown below:

Column 4, line 63, "pont" should read --point--. Column 4, line 68, "n" should read --in--. Column 5, between lines 60 and 61, should read --acters, this information is coupled to the register and--. Column 8, line 10, "of" should read --or--. Column 8, line 23, "an" should read --and--. Column 8, line 55, "portion" should read --portions--. Column 12, line 71, "ovelop" should read --develop--. Column 12, line 71, "termal" should read --thermal--. Column 13, line 22, "102" should read --103--. Column 13, line 53, "curernt" should read --current--. Column 15, line 24, "could" should read --would--. Column 16, line 25, "terminals" should read --terminal--.

Signed and sealed this 6th day of April 1971.

(SEAL)
Attest:

EDWARD M. FLETCHER, JR.          WILLIAM E. SCHUYLER, JR.
Attesting Officer                 Commissioner of Patents